UNITED STATES PATENT OFFICE.

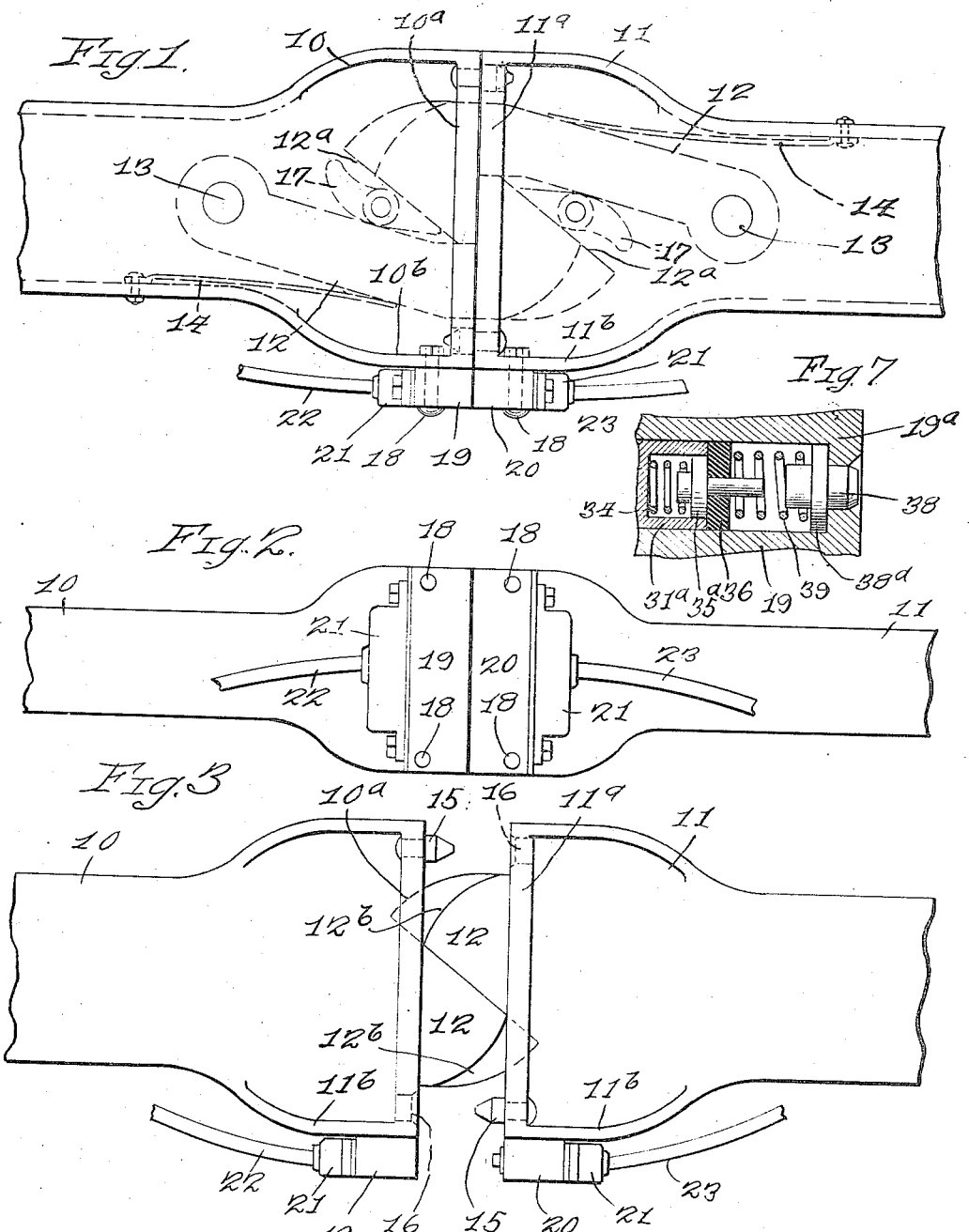

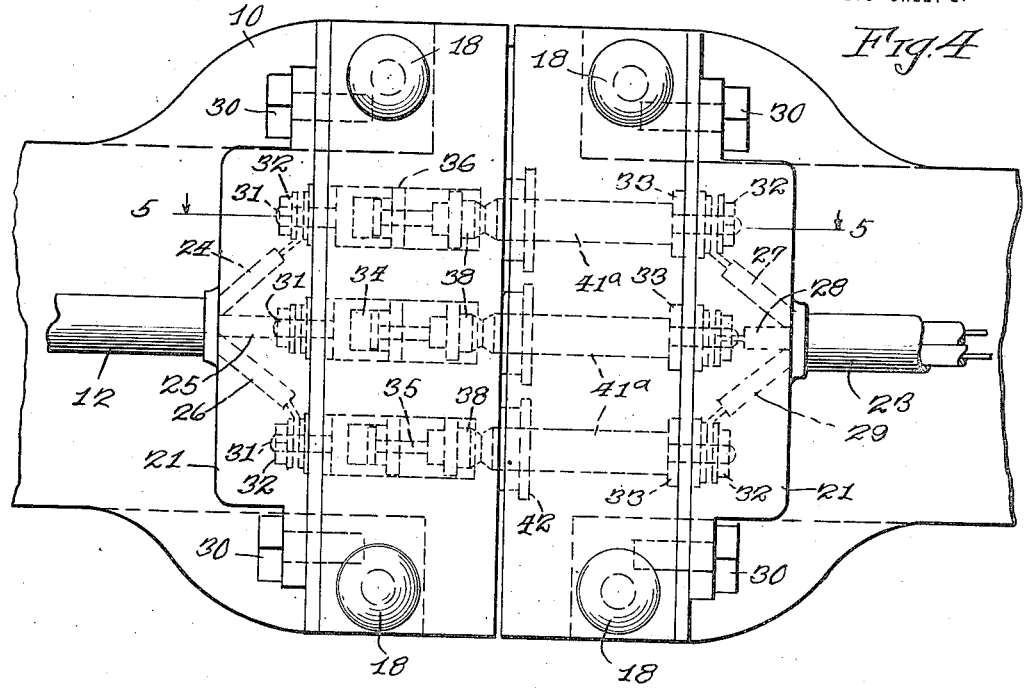
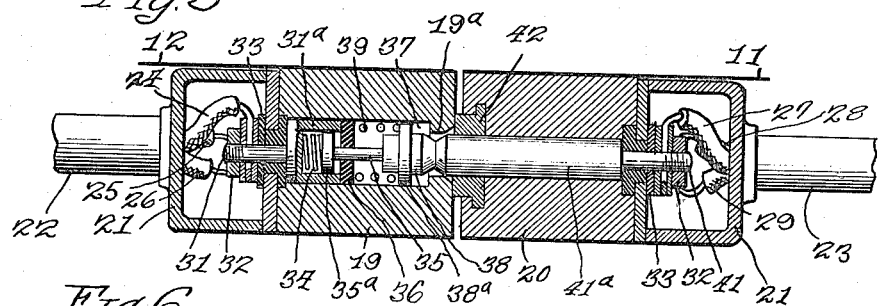
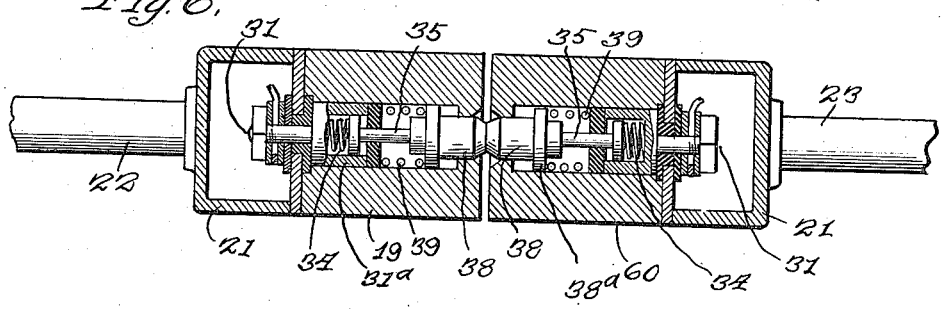

CHARLES H. TOMLINSON, OF MANSFIELD, OHIO.

CAR AND ELECTRIC COUPLING DEVICE.

1,300,789.  Specification of Letters Patent.  Patented Apr. 15, 1919.

Application filed June 10, 1914. Serial No. 844,180.

*To all whom it may concern:*

Be it known that I, CHARLES H. TOMLINSON, a citizen of the United States, residing at Mansfield, in the county of Richland and State of Ohio, have invented certain new and useful Improvements in Car and Electric Coupling Devices, of which the following is a specification.

The invention relates to an improvement in coupling devices, of the general type shown and described in my United States Patent, No. 1,094,612, granted April 28, 1914, on automatic car and train pipe couplings, and the primary object of the invention is to provide a combined car and electric coupling device which shall be capable of automatically coupling together two cars, each provided with the invention, and at the same time coupling together one or more electric circuits between said cars.

A further object of the invention is to provide a car and electric coupling device which shall be simple and economical to construct and which shall be efficient in operation.

It is a further object of the invention to provide in combination with car coupling mechanism, coupling mechanism for electric circuits between two coöperating cars in which the live contacts or live terminals of the circuits of one or both of the cars shall be protected.

It is a still further object of the invention to provide in combination with car coupling mechanism an electric coupling device of a character that may be readily attached to automatic car coupling devices and which readily lends itself to automatic operation in coupling and uncoupling electric circuits during the coupling and uncoupling operations of said car coupling devices.

The objects of the invention will appear from the following description, taken in connection with the accompanying drawings, all of which refers to the preferred embodiment of the invention and as more specifically pointed out in the appended claims.

In the said drawings:

Figure 1 is a top plan view of a pair of coöperating car coupling devices shown in the coupled position and embodying in combination the invention.

Fig. 2 is a side elevation view of the devices shown in Fig. 1.

Fig. 3 is a view similar to Fig. 1, showing the coupling devices in the separated or uncoupled position.

Fig. 4 is an enlarged detail side elevation view of the devices of Fig. 1.

Fig. 5 is a horizontal detail sectional view on line 5—5 of Fig. 4.

Fig. 6 is a detail sectional view similar to Fig. 5, but showing a modification of the structure of Figs. 4 and 5.

In Figs. 5 and 6 the electric coupling devices are shown in the coupled position, but in the detail view.

In Fig. 7, one of the electric coupling devices of Fig. 5, and both the devices of Fig. 6 are shown in the uncoupled position, illustrating the manner in which the electric terminals are disconnected from the circuit upon the separation of the coupling devices.

The present invention is primarily, although not exclusively, adapted in coupling together trains consisting of a small number of cars, as for example, a motor car and a single trailer car, and in the illustrations of the invention, as shown in Fig. 1 *et seq.*, the car coupler head on the left side of each figure of the drawings is on a motor car, such coupler head being designated by the reference character 10, while 11 is the coupler head of the trailer car. The coupler heads 10 and 11 are provided with the usual contacting forward faces 10$^a$ and 11$^a$, and are each provided preferably on their hollow interiors, when of the construction shown in my prior patent referred to, with coupling hooks or coupling devices 12, each pivoted to the coupler heads 10 and 11 at 13, and being provided with beveled contacting faces, as indicated at 12$^a$, which coöperate with each other when the couplers are brought into the coupling relation and crowd each other apart against the action of the springs 14, thus alining the coupler heads on the two cars within certain limits, as explained in my former patent, bringing the coupler heads into such relation, and particularly the conical pointed pins 15, of which there are one or more on each coupler head, that these pins will register with the corresponding depressions or openings 16 on the opposite faces of the coupler heads 10$^a$ and 11$^a$, and bringing these projections or pins into such position that their conical points will enter such openings or intersections on the corresponding coupler head, and thus complete the correct alinement of the coupler heads just prior to and at the time the faces 10ª and 11ª come into engaging relation in the manner also fully set forth in my patent referred to. The pivoted coupling devices 12 may be operated to the uncoupled position, allowing the separation of the coupler heads by the cam members 17, pivotally mounted, as shown, in the coupler heads and arranged to be operated in any suitable manner for the purpose of separating the hooked portions of the coupling devices 12 against the action of springs 14. The coupling devices 12 are preferably beveled also on their upper and lower forward edges, as indicated, for example, at 12ᵇ, for the purpose of securing a vertical as well as horizontal alinement of the coupler heads in a well known manner, and as set forth in my prior patent referred to. The coupler heads 10 and 11 may be constructed with relatively thin walls or flanges, as indicated at 10ᵇ and 11ᵇ, which affords a convenient construction for the attachment of my improved electrical coupling devices, which are shown secured thereto by suitable retaining bolts, as indicated at 18, Figs. 1 and 2, the electrical coupling devices themselves being shown also in these views and in other views, Figs. 1 to 5 inclusive. The main casing of the electric coupling device on the coupler head of the motor car, which it will be remembered is the one to the left of each figure, is designated by the reference character 19 and is preferably constructed of wood or other suitable insulating material, wood being preferred, and the similar casing of the electric coupling device on the trailer car coupler head 11, of the same material, is indicated by the reference character 20. Connected with each of the insulating blocks or casings 19 and 20 of the motor car and trailer car electric couplers respectively is a protective casing of metal or other suitable material, indicated on both electric coupling devices by the reference character 21. Through an opening in the members 21 the cables 22, 23 are passed and carry the circuit wires of any desired number to a point adjacent the insulating blocks 19 and 20, where these circuit wires, indicated by the reference characters 24 to 26 on the motor coupler and 27 to 29 inclusive on the trailer coupler are brought to a position for electrical connection with the various binding posts of the coupler connections, supported in the insulating blocks 19 and 20. The details of construction of the circuit connections are well shown in sectional views 5 and 7. Since there may be three pairs of connections, for three electric circuits, as shown, or connections for any desired number of circuits, as electric circuits for signals, lighting, etc., between any two coupled cars, it will, therefore, be sufficient to describe the construction of a single pair of connectors, as the number of such pairs of connectors will vary according to the number of circuits required, and each pair will be identical in construction. There is, however, in the form shown in Figs. 4, 5, and 7, a difference in the structure of the terminal connections in the motor car block 19 and the trailer car block 20. The casings 21, designed to protect the ends of the binding posts, are secured to the respective blocks 19 and 20 by suitable bolts or screws, as indicated at 30. The binding posts in the terminal block 19 are indicated by the reference character 31, being threaded at their outer extremities to take the threaded nuts 32, which are utilized to bind the ends of the circuit wires 24 to 26 inclusive to the posts 31 between suitable washers in the usual manner, as illustrated in the drawings. The posts 31 are passed through perforations in the back wall of the housing 21, being insulated therefrom by suitable insulating material, as indicated at 33. The binding post 31 is provided with an enlarged tubular extension projecting into an opening in the block 19, which is indicated by the reference character 31ª, and forms a cylindrical interior housing, in which is positioned a coil spring 34 or other suitable elastic means tending normally to project terminal pin 35 outwardly from the housing therein, so that the collar 35ª on this pin will tend to rest normally against a perforated insulating closure member 36, placed over the opening in the enlarged tubular portion 31ª of the binding post. The cylindrical opening accommodating the parts last described on the interior of the block 19, which opening is designated generally by the reference character 37, is preferably uniform in diameter except at the contact face of the block, where it is contracted, forming the peripheral shoulder 19ª, which serves as a stop for an enlargement or collar 38ª on terminal plug 38. A coil spring 39 is interposed between the collar 38ª on the plug 38 and the insulating washer 36. On the terminal block 20 on the coupler head of the trailer car the construction of the housing 21 is the same, this part being given the same designating number and the binding post, which is designated by the reference character 41, is screw-threaded like the post 31 and is provided with the same connections for attaching the circuit wires 27 to 29 inclusive thereto, consisting of threaded member or nut 32 and the usual washers, not given reference characters. The post 41 passes through the wall of the housing 21, through insulating member 33, and is provided with an enlarged cylindrical portion 41ª, extending longitudinally of block 20 and terminating some distance in advance of the forward face of the block 20, being surrounded on the forward face of the block by a protecting member 42, preferably of some firm material, as metal, to hold this terminal pin 41ª in a rigid position with respect to the block 20.

The operation of the couplers will be as follows: Assuming the trailer car and the motor car couplers to be separated, the electrical contact plugs on the motor car will obviously be dead, although the circuits 24 to 26 inclusive will be alive, because the normal position of the plug 38 will be that shown in Fig. 7, in which the action of coil spring 39 against collar 38ª of this block will move it to a position where there will be a gap or break between the dead plug and the constantly live plug 35 in contact with the circuit wires 24 to 26 respectively, for, assuming that the circuits 24 to 26 are alive at all times, it will be seen that the current will pass through binding post 31 and coil spring 34, or housing 31ª to collar 35ª and the live terminal 35. This construction is an important feature of the invention, because when the motor car is uncoupled from the trailer the plugs 38 will be exposed and it is important for the purposes of safety that they shall not be alive at this time. On the other hand, it is not important that the same provision shall be made with respect to the terminal plug 41ª in the trailer coupler, because the connections on this car only receive current from the motor car and hence the entire wiring circuits on the trailer will be dead whenever the trailer is uncoupled from the motor car. When the motor car and the trailer are brought into the coupling relation the coupling devices 12 on the two coupler heads will first come in contact and the alinement of the coupling devices will take place in the manner described in my prior patent referred to. The beveled surfaces 12ª and 12ᵇ on the coupling devices 12, coöperating with beveled openings on the companion coupler heads, will first aline the couplers so that when their coupling faces have approached to a position a little nearer together than shown in Fig. 3, the conical alining plugs 15 will coöperate with the recesses on the companion heads, the final alinement of the coupler will take place, and the electrical coupler blocks 19 and 20 will be alined, so that the coöperating plugs 38 and 41ª will be in alinement, and the final movement of the couplers, together, will cause the fixed plug 41ª to engage the forward extremity of the movable plug 38 and move the plug 38 from the position shown in Fig. 7 against the action of coil spring 39 to the position of this plug in Fig. 5, in which the plug is in contact with the live terminal plug 35, thus completing the circuit through the coupler connections and joining the corresponding circuit wires 24, 27 and 25, 28, etc.

In Fig. 6 I show a modified form of the electric coupler on the trailer car, the corresponding coupling or connection on the motor car being identical with the form shown and described in the drawings already referred to and consequently the same reference characters are applied to the corresponding parts on the motor. The block of the electric coupler on the trailer car is designated by the reference character 60 and upon an inspection of same it will be seen that it is a duplicate of the block 19 adapted for use on a companion car. In the same manner the plug 38 in block 60 is a duplicate of the corresponding plug on the motor car connection, and the same is true of the spring 39, live terminal 35, the spring 34, the binding post 31, all of which parts are given the same designating characters. It will be apparent from the foregoing description that the construction of the electric connection shown on the trailer coupler of Fig. 6 may be employed for trailer cars, if desired, particularly under conditions where it may be necessary or advantageous to disconnect the terminal connections on the trailer car when this car is uncoupled from the motor car. Unless it is desirable, however, that the terminals of the trailers shall be dead when the trailers are uncoupled, the construction of the trailer electrical connections shown in Figs. 4 and 5 is preferred.

From the foregoing description of my improved coupler mechanism it will be seen that the construction is exceedingly simple and efficient and the electric coupling devices are easily made and attached to the car coupler devices, the peculiar construction and operation of my car coupling devices in securing a perfect alinement of the coupling devices rendering them satisfactory and efficient.

The herein desribed electrical coupling devices are also exceedingly easy to manufacture and are easily installed, replaced, or repaired.

In order that the invention might be understood, the preferred embodiments have been shown and described, but it is not desired that the claims shall be limited to the details of construction, for it will be apparent that persons skilled in the art may depart materially from such constructions, while availing themselves of the purpose and spirit of the invention.

I claim:

1. In an electric coupler, an insulated casing, projecting yielding butt end contacts therein, automatic means to aline similar casings and register the contacts before they abut by direct longitudinal movement, and means to prevent independent vertical, lateral and longitudinal movement when two similar casings are coupled.

2. In an electric coupler, a pair of casings, projecting yielding butt end contacts in each casing, means adapted to automatically register the contacts in direct longitudinal alinement before they abut, and means to prevent relative vertical, lateral and longitudinal movement of the casing when coupled.

3. In an electric coupler, a pair of similar casings each comprising a live terminal and a normally dead exposed butt end contact movable against the live terminal, and alining and locking means to prevent independent lateral, vertical and longitudinal movements of the casings.

4. In an electric coupler, a pair of similar devices each comprising yielding butt end contacts projecting therefrom, direct longitudinally registering means adapted to prevent independent vertical and lateral movement of the contacts when they are brought together, and means to prevent longitudinal movement of the devices.

5. In an electric coupler, a pair of casings, projecting butt end contacts in each casing, means adapted to register the contacts in direct alinement and to prevent their independent vertical and lateral movement, and means to prevent the longitudinal movement of the casings.

6. In an electric coupler, a pair of similar holders with butt end contacts projecting therefrom, means adapted to register the contacts in direct alinement before they abut, and other means to connect the holders together against relative movement in any direction.

7. In an electric coupler, a pair of similar holders with yielding butt end contacts projecting therefrom, means adapted to preliminarily aline the holders and contacts before the latter are brought together, and other means to complete the alinement of the contacts and to prevent the relative lateral or vertical movement of the holders and contacts with respect to each other when the said holders are coupled.

8. In an electric coupler, a pair of similar holders with yielding butt end contacts projecting therefrom, projecting interlocking means to preliminarily aline the holders and contacts, and final alining means for the contacts which holds them against relative side or vertical movement, the interlocking means holding the contacts from relative longitudinal movement.

9. In an electric coupler, a pair of similar holders with butt end contacts projecting therefrom, projecting interlocking means to preliminarily aline the holders and contacts, final alining means for the contacts which prevents relative lateral or vertical movement of the holders, the interlocking means preventing relative longitudinal movement thereof, and yielding means for maintaining the contacts of similar holders together when they are coupled.

10. An electric coupler comprising a pair of similar connecting devices each provided with means for automatically alining the devices prior to final engagement, means for automatically locking the devices in coupled relation after final engagement and maintaining the locked relation until the locking means is released, a live terminal, a separate movable butt end contact, a spring for normally holding the contact away from the live terminal, and a spring for holding the contact and live terminal together when the first-mentioned spring has been compressed by the coupling and locking together of the two devices.

11. An electric coupler comprising a pair of counterpart connecting devices each provided with a live terminal, a movable spring-compressed member in engagement with each live terminal, a spring-compressed contact exposed for butt end engagement and normally held out of connection with the spring-pressed member but movable with the said member against the spring of said member when the butt end connection of one device engages the corresponding connection of the similar device, means for automatically alining the devices prior to engagement of the butt end connection, and means automatically interlocking for holding the butt end connection of one device in engagement with the corresponding connection of the other device.

12. An electric coupler comprising a pair of counterpart connecting devices each provided with an insulating block, a live terminal member movably mounted in said block, elastic means holding said live terminal in a predetermined position in said insulating block, a movable butt end contactor accessible from the exterior of the insulating block, resilient means for normally holding the contactor out of engagement with the live terminal member, means for automatically alining the devices prior to engagement of the butt end contactor of one device with the corresponding contactor on the counterpart device, and automatically interlocking means on each device for holding the devices in a coupled relation.

13. An electrical connecting device comprising an insulating block, a terminal member rigidly secured to said block and being provided with a socket, a movable plug in said socket elastically controlled in relation thereto and having constant electrical connection therewith, there being a portion of said plug extending into a housing in said insulating block, a terminal plug having a contacting portion accessible from the exterior of the insulating block, and elastic means for holding said terminal plug normally out of contact with said movable plug.

14. An electric coupler comprising a pair of similar connecting devices each provided with a live terminal, a separate movable butt end contact, resilient means for normally holding the movable contact away from the terminal and for holding the contact and terminal together when the live terminal is engaged, means for automatically alining the connecting devices, and means for automatically interlocking and holding the corresponding butt end contact of the connected devices together.

15. An electrical connecting device comprising a live terminal and a separately movable butt end contact, resilient means for normally holding the movable contact away from the live terminal and for yieldingly holding the contact and terminal together when the live terminal is engaged, and means for alining the connecting device with a counterpart device.

16. An electrical connecting device comprising a projecting live terminal, a separately movable butt end contact, means for normally holding the contact away from the terminal, means in connection with the device for preliminarily alining it with a counterpart connecting device, and means for finally alining the device so that the contact is engaged by the corresponding contact of a counterpart device.

17. In an electrical connecting coupler, a pair of counterpart devices each comprising a live terminal and a separately movable but end contact, means for normally holding the contact away from the terminal, a preliminary alining means, and a final alining means for said devices whereby the butt end contacts are moved together in connecting them.

18. The combination with a pair of duplicate electrical connecting devices each provided with an insulated live terminal and a normally exposed contact, of separate preliminary automatic alining means therefor, final alining means for guiding the exposed contacts together and in contact with their corresponding live terminals, and means automatically holding the devices against uncoupling.

19. The combination of a pair of counterpart electrical connecting devices each comprising a live terminal, a separately movable butt end contact and resilient means for normally holding the contact away from the terminal; and preliminary alining means, the abutment of the exposed contacts being adapted to move them against their springs in contact with their live terminals.

20. In an electric coupler, a pair of counterpart devices each comprising a live terminal and a normally dead exposed contact movable against the live terminal, a spring for normally holding the contact away from the terminal, another spring for holding the contact and terminal together when the first-mentioned spring is compressed by engagement of the contact, means for partially alining the devices when they are brought together, and a final alining means for the devices operative after the other alining means to bring the exposed contacts in engagement with each other.

21. In an electrical coupler, a pair of counterpart connecting devices, a projecting interlocking means for partially alining the devices before impact, each device comprising a live terminal, a separately movable butt end contact, and means for normally holding the contact away from the terminal until it is engaged by the contact of the counterpart device.

22. In an electrical coupler, a pair of counterpart connecting devices, a projecting interlocking means for partially alining the devices, final alining means for the devices prior to the electrical contacting, each device comprising a live terminal member and a normally dead exposed contact movable against the live terminal, a spring for normally holding the contact away from the terminal, and a spring for holding the contact and terminal together when the first-mentioned spring is compressed by engagement of the contacts.

23. In an electric coupler, a pair of casings, projecting butt end contacts in each casing, fixed terminals in each casing, and intermediate yielding means to form an electrical connection between each fixed terminal and its butt end contact.

24. An electrical connecting device comprising an insulated casing, projecting butt end contacts, and fixed electrical contacts therein, intermediate means to form an electrical connection between the fixed electrical contacts and the butt end contacts, and yielding means adapted to maintain the intermediate means in electrical connection with the said contacts.

25. An electrical connecting device comprising an insulated casing, projecting butt end contacts, and fixed electrical contacts therein, an intermediate member to form an electrical connection between each fixed contact and its corresponding butt end contact, and yielding means tending to separate each pair of contacts.

26. In an electrical coupler, a pair of insulated casings, fixed electrical terminals therein, projecting butt end contacts adapted to engage the butt end contacts of similar devices, means to automatically register the projecting contacts from impact with other ones and to prevent independent movement of the casings, and yielding means adapted to maintain electrical connection between the said terminals and butt end contacts.

27. In an electrical connecting device, an insulated casing, a live terminal and a separately movable butt end contact in the casing, and an intermediate yielding member forming an electrical connection between the butt end contact and the live terminal.

28. In an electrical coupler, a pair of insulated casings, a plurality of live terminals and separately movable butt end contacts in each casing, intermediate yielding means forming an electrical connection between each butt end contact and its corresponding live terminal, and means to automatically aline the butt end contacts of connecting devices before they are brought together and to prevent relative lateral movement after they are brought together.

In testimony whereof I have signed my name to this specification, in the presence of two subscribing witnesses, on this 6th day of June A. D. 1914.

CHARLES H. TOMLINSON.

Witnesses:
    LOUISE A. TOMLINSON,
    JANE BEAR.